2,835,587

COFFEE BREWING PACKAGE

Louis Maggiore, Rockville Centre, N. Y.

No Drawing. Application July 25, 1955
Serial No. 524,283

2 Claims. (Cl. 99—77.1)

The present invention relates to a method of dispensing roasted coffee and preserving the aroma thereof, and particularly relates to a method of preserving the aroma of freshly roasted coffee.

It is among the objects of the present invention to provide a novel packaging system for the use to enable dispensing and distribution of roasted coffee in such a manner that the flavor will be preserved for long periods of time, even though the coffee be packed in envelopes or bags.

Another object of the present invention is to provide a novel coffee dispensing system in which the coffee will be preserved in a freshly roasted condition without the necessity of vacuum packaging.

Another object of the present invention is to provide the packaging of coffee in individual portions, which will preserve the taste and aroma of the coffee and permit the coffee to be dispensed in individual packages similar to tea bags, so that there may be individual brewing of coffee with hot water.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a novel packaging material consisting of a porous paper bag or closure which has been impregnated with a relatively high molecular weight water soluble polyhydric material such as a polyhydric alcohol having some four to eight hydroxy groups, which at the same time will be free of aldo or keto groups.

Among the preferred polyhydric compounds which may be used are the crystalline high molecular weight aliphatic alcohols such as mannitol or mannite.

Less preferably polyhydric material such as sorbitol, pentaerythritol or hexitol may be used.

Sugars such as dextrose, levulose, sucrose, maltose or lactose cannot be utilized because of their reactive aldo or keto groups, or because they break down, particularly in the presence of moisture.

With mannitol the impregnated paper wrapper is very stable and there is no tendency for the coffee to lose its aroma or flavor because of any contact with any reactive groups.

By impregnating a paper wrapping material such as a tea bag with a mannitol solution followed by drying and by placing the ground or unground freshly roasted coffee therein, it is found that the coffee is maintained in a highly stable condition, and the bag may be brewed in a cup of hot water without loss in the desirable taste and flavor of the coffee and with assurance that upon brewing, the coffee will have a fresh fragrant flavor.

Although various modifications may be employed, it has been found that the use of a lightweight thin paper absorbent containing five to ten percent of its weight of dried mannitol may be most satisfactorily employed to preserve the flavor of the coffee and prevent any oxidation from the air.

Furthermore, the mannitol will dissolve itself in the brew solution and will be a most desirable sweetening agent not having any diabetic objection.

The mannitol when used in the bag absorbent material will not tend to ferment or be water absorbent and, although it is stable at very high temperatures and varying high humidities, nevertheless when brewed it will quickly become soluble in water and will not tend to cake or break down.

In the preferred form of the invention, the fibrous paper material, which should be of a long fiber stock and capable of retaining its strength when immersed in hot or boiling water, is run through a bath or solution containing the mannitol. If desired, the mannitol may contain small quantities of one percent to five percent of a non-hygroscopic gum which will aid in the adhesion of the mannitol and at the same time protect the coffee inside of the wrapper or package.

To give some suitable combinations, an aqueous solution may contain 20 percent of mannitol and 2 percent of gum tragacanth or arabic. Such an aqueous composition will be readily absorbed in the long fiber paper and at the same time, when placed in boiling water, readily removed so that the coffee flavor may come through the bag structure.

The following are some additional compositions for solutionizing and impregnating bath to impregnate the paper material:

*Example II*

Mannitol _____ 20
Dextrine _____ 2
Sorbitol _____ 5
(All parts being by weight)

*Example III*

Mannitol _____ 10
Pentaerythritol _____ 5
Pectin _____ 2

*Example IV*

Mannitol _____ 15
Agar agar _____ 5

*Example V*

Mannitol _____ 20
Polyethylene glycol _____ 2

It is thus apparent that the applicant by impregnating the fibrous bag materials with the compositions as set forth has produced a novel packaging material, which, although particularly adapted for coffee, might also be used for tea.

Moreover when either coffee or tea is enclosed in the bag material, the bag when placed in boiling water will readily release the protective mannitol impregnation and permit the desired flavor to penetrate into the fluid to form a freshly brewed cup of coffee or tea, which will have its basic fragrance unimpaired.

Having now particularly described and ascertained the nature of the invention, and in what manner the same is to be performed:

What is claimed is:

1. A novel individual brewing package containing finely ground roasted coffee enclosed in a fibrous porous paper envelope, said paper being impregnated with mannitol, said paper envelope so impregnated serving to maintain and retain the fresh fragrant flavor and aroma of the freshly roasted coffee and when placed in hot water permitting ready penetration of the water into the interior of the envelope with dissolution of the mannitol.

2. The package of claim 1, said paper envelope carrying 5 to 10% of mannitol and said mannitol containing 1 to 5% of gum tragacanth.

References Cited in the file of this patent

UNITED STATES PATENTS

| | | |
|---|---|---|
| 313,107 | Ramsdell | Mar. 3, 1885 |
| 1,010,721 | Brown | Dec. 5, 1911 |
| 1,324,662 | Goldsworthy | Dec. 9, 1919 |
| 2,183,173 | Segura | Dec. 12, 1939 |
| 2,253,655 | Shurley | Aug. 26, 1941 |
| 2,329,472 | Koonz | Sept. 14, 1943 |
| 2,511,804 | Hall et al. | June 13, 1950 |